United States Patent
Bostick et al.

(10) Patent No.: US 9,703,600 B2
(45) Date of Patent: *Jul. 11, 2017

(54) AUTOMATED CREATION OF EXECUTABLE WORKFLOW

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,705

(22) Filed: Feb. 15, 2016

(65) Prior Publication Data

US 2016/0162333 A1    Jun. 9, 2016

Related U.S. Application Data (63) Continuation of application No. 14/499,319, filed on Sep. 29, 2014, now Pat. No. 9,311,134.

(51) Int. Cl.
| | |
|---|---|
| *G06F 9/44* | (2006.01) |
| *G06F 9/48* | (2006.01) |
| *G06F 9/46* | (2006.01) |
| *G06F 3/16* | (2006.01) |

(52) U.S. Cl.
CPC ............ *G06F 9/4881* (2013.01); *G06F 3/167* (2013.01); *G06F 9/46* (2013.01)

(58) Field of Classification Search
None
See application file for complete search history.

(56) References Cited

U.S. PATENT DOCUMENTS

| | | |
|---|---|---|
| 8,381,207 B2 | 2/2013 | Asare et al. |
| 8,494,987 B2 | 7/2013 | Katukuri et al. |
| 8,601,481 B2 | 12/2013 | Aharoni et al. |
| 8,660,881 B2 | 2/2014 | Wood et al. |
| 9,015,533 B1* | 4/2015 | Fateev ................ G06F 11/0742 714/38.1 |
| 9,152,533 B1* | 10/2015 | Fateev .................... G06F 11/36 |

(Continued)

FOREIGN PATENT DOCUMENTS

| | | |
|---|---|---|
| EP | 2518620 A1 | 10/2012 |
| WO | 03081389 A2 | 10/2003 |
| WO | 2007098243 A3 | 8/2007 |

OTHER PUBLICATIONS

Computer Associates™, "AllFusion™ Process Modeler", http://www.virginia.edu/crmes/stip/BPwinGSG.pdf, Computer Associates International, Inc. (CA), 2002, 77 pages.

(Continued)

*Primary Examiner* — Chameli Das
(74) *Attorney, Agent, or Firm* — L. Jeffrey Kelly (57) ABSTRACT

A computing device receives information describing one or more workflow components. The computing device determines whether at least one executable step can be determined for each of the one or more workflow components. The computing device provides an indication of whether at least one executable step can be determined for each of the one or more workflow components.

15 Claims, 4 Drawing Sheets

(56) References Cited

U.S. PATENT DOCUMENTS

| | | | |
|---|---|---|---|
| 2005/0120347 A1* | 6/2005 | Asare | G06F 8/63 |
| | | | 717/177 |
| 2006/0074730 A1* | 4/2006 | Shukla | G06Q 10/06 |
| | | | 705/7.27 |
| 2006/0136279 A1 | 6/2006 | Maybee et al. | |
| 2007/0136117 A1* | 6/2007 | Matsueda | G06Q 10/06 |
| | | | 358/1.15 |
| 2007/0233543 A1 | 10/2007 | Oshima | |
| 2008/0007766 A1 | 1/2008 | Sasakuma | |
| 2009/0019271 A1 | 1/2009 | Kawakami | |
| 2009/0119639 A1* | 5/2009 | Grasselt | G06Q 10/06 |
| | | | 717/107 |
| 2009/0192954 A1* | 7/2009 | Katukuri | G06F 17/3061 |
| | | | 706/11 |
| 2009/0282417 A1 | 11/2009 | Yoshida | |
| 2010/0027053 A1 | 2/2010 | Togo | |
| 2010/0083215 A1* | 4/2010 | Bogl | G06Q 10/06 |
| | | | 717/105 |
| 2010/0123930 A1* | 5/2010 | Tomizawa | G06Q 30/06 |
| | | | 358/1.15 |
| 2010/0131459 A1 | 5/2010 | Todaka | |
| 2010/0131792 A1* | 5/2010 | Herrod | G06F 11/0742 |
| | | | 714/2 |
| 2011/0035619 A1* | 2/2011 | Watariuchi | G06F 11/1402 |
| | | | 714/3 |
| 2011/0208796 A1* | 8/2011 | Riley | G06F 9/546 |
| | | | 709/201 |
| 2012/0143648 A1 | 6/2012 | Wood et al. | |
| 2012/0227047 A1* | 9/2012 | Aharoni | G06F 9/46 |
| | | | 718/102 |
| 2012/0229468 A1* | 9/2012 | Lee | G06F 9/4443 |
| | | | 345/440 |
| 2012/0240187 A1* | 9/2012 | Childress | G06Q 10/0633 |
| | | | 726/1 |
| 2013/0127836 A1 | 5/2013 | Joshi et al. | |
| 2013/0179208 A1* | 7/2013 | Chung | G06Q 10/06 |
| | | | 705/7.15 |
| 2013/0227285 A1* | 8/2013 | Bracher | G06F 21/62 |
| | | | 713/168 |
| 2013/0332929 A1* | 12/2013 | Brown | H04L 43/0817 |
| | | | 718/100 |
| 2013/0339922 A1* | 12/2013 | Sproule | G06Q 10/063 |
| | | | 717/103 |
| 2013/0347001 A1 | 12/2013 | Furukawa et al. | |
| 2014/0310595 A1* | 10/2014 | Acharya | G06F 9/4446 |
| | | | 715/706 |
| 2014/0379879 A1 | 12/2014 | Bartlett et al. | |
| 2015/0160969 A1* | 6/2015 | Kishore | G06F 11/3065 |
| | | | 718/102 |
| 2015/0161546 A1* | 6/2015 | Stoyanov | G06Q 10/06316 |
| | | | 705/7.26 |
| 2015/0317038 A1* | 11/2015 | Mianji | G06F 3/0482 |
| | | | 715/745 |

OTHER PUBLICATIONS

"DeveloperWorks", http://www.ibm.com/developerworks, accessed on Jun. 9, 2014, IBM, pp. 1-3.

"Introduction to IBM Rational Requirements Composer v3.0.1.1", YouTube video, posted by IBM Rational User Education, Jan. 20, 2012, https://www.youtube.com/watch?v=-G7DVPIUqUM.

"Rational Requirements Composer", YouTube video, posted by TheOnDemandDemoGuy, Jan. 26, 2009, https://www.youtube.com/watch?v=0zzicwf5m00.

Bostick et al., "Automated Creation of Executable Workflow," U.S. Appl. No. 14/499,319, filed Sep. 29, 2014.

List of IBM Patents or Patent Applications Treated as Related, Signed Feb. 12, 2016, 2 pages.

* cited by examiner

AUTOMATED CREATION OF EXECUTABLE WORKFLOW

BACKGROUND

The present invention relates generally to executable workflow, and more particularly to utilizing natural language processing and voice recognition to automate creation of executable workflow.

Touch enabled devices allow a user to interact with a computing device without having to use an input device such as a mouse or a keyboard. Some touch enabled devices are compatible with stylus pens which allow a user to write or draw directly on the display. This allows a user to quickly take an idea, jot it down with a pen-like device, and digitally store it in a computing device. This can be preferable to typing and dealing with standardized fonts, spacing, text re-sizing, and other similar factors that are prevalent in word processing and presentation software.

SUMMARY

Embodiments of the present invention provide a system, method, and program product for determining executable steps corresponding to one or more workflow components. A computing device receives information describing one or more workflow components. The computing device determines whether at least one executable step can be determined for each of the one or more workflow components. The computing device provides an indication of whether at least one executable step can be determined for each of the one or more workflow components.

DETAILED DESCRIPTION

Embodiments of the present invention will now be described in detail with reference to the accompanying Figures.

Figure 1:
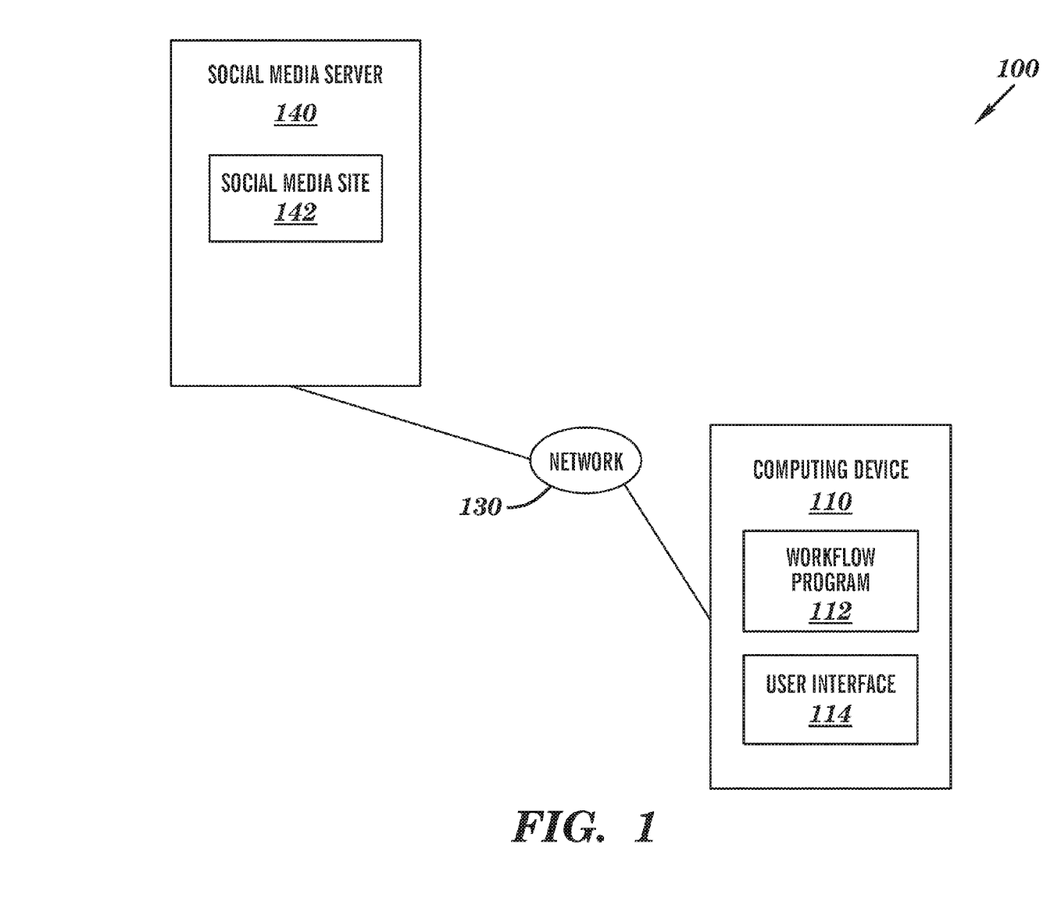
FIG. 1 illustrates a workflow creation system, in accordance with an embodiment of the invention.

FIG. 1 illustrates workflow creation system 100, in accordance with an embodiment of the invention. In an example embodiment, workflow creation system 100 includes computing device 110 and social media server 140 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between computing device 110 and social media server 140.

Social media server 140 includes social media site 142. Social media server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, social media server 140 can comprise a cluster of web servers executing the same software to collectively process the requests for the web pages as distributed by a front end server and a load balancer. In the example embodiment, social media server 140 is a computing device that is optimized for the support of websites which reside on social media server 140, such as social media site 142, and for the support of network requests related to websites, which reside on social media server 140. Social media server 140 is described in more detail with reference to FIG. 4.

Social media site 142 is a collection of files including, for example, HTML files, CSS files, image files and JavaScript files. Social media site 142 can also include other resources such as audio files and video files.

Computing device 110 includes workflow program 112 and user interface 114. Computing device 110 may be a desktop computer, a notebook, a laptop computer, a tablet computer, a handheld device, a smart-phone, a thin client, or any other electronic device or computing system capable of receiving and sending data to and from other computing devices, such as social media server 140, via network 130. In the example embodiment, computing device 110 is a touch enabled device capable of receiving input via a stylus pen or a similar device that is capable of free form sketching. Although not shown, optionally, computing device 110 can comprise a cluster of web devices executing the same software to collectively process requests. Computing device 110 is described in more detail with reference to FIG. 4.

User interface 114 includes components used to receive input from a user and transmit the input to an application residing on computing device 110. In the example embodiment, user interface 114 uses a combination of technologies and devices, such as device drivers, to provide a platform to enable users of computing device 110 to interact with workflow program 112. In the example embodiment, user interface 114 receives input, such as textual input received from a physical input device, such as a keyboard, via a device driver that corresponds to the physical input device.

Workflow program 112 is software capable of receiving information, such as voice input or input via stylus, and creating an executable workflow from the received information. In addition, in the example embodiment, workflow program 112 is capable of indicating whether or not a portion of the workflow is executable or in need of clarification. Workflow program 112 is also capable of communicating with other computing devices, such as social media server 140 via network 130. Furthermore, workflow program 112 is also capable of utilizing voice recognition, optical character recognition (OCR), natural language processing, and other means to identify received input and information. The operations and functions of workflow program 112 is described in more detail with reference to FIG. 4.

Figure 2:
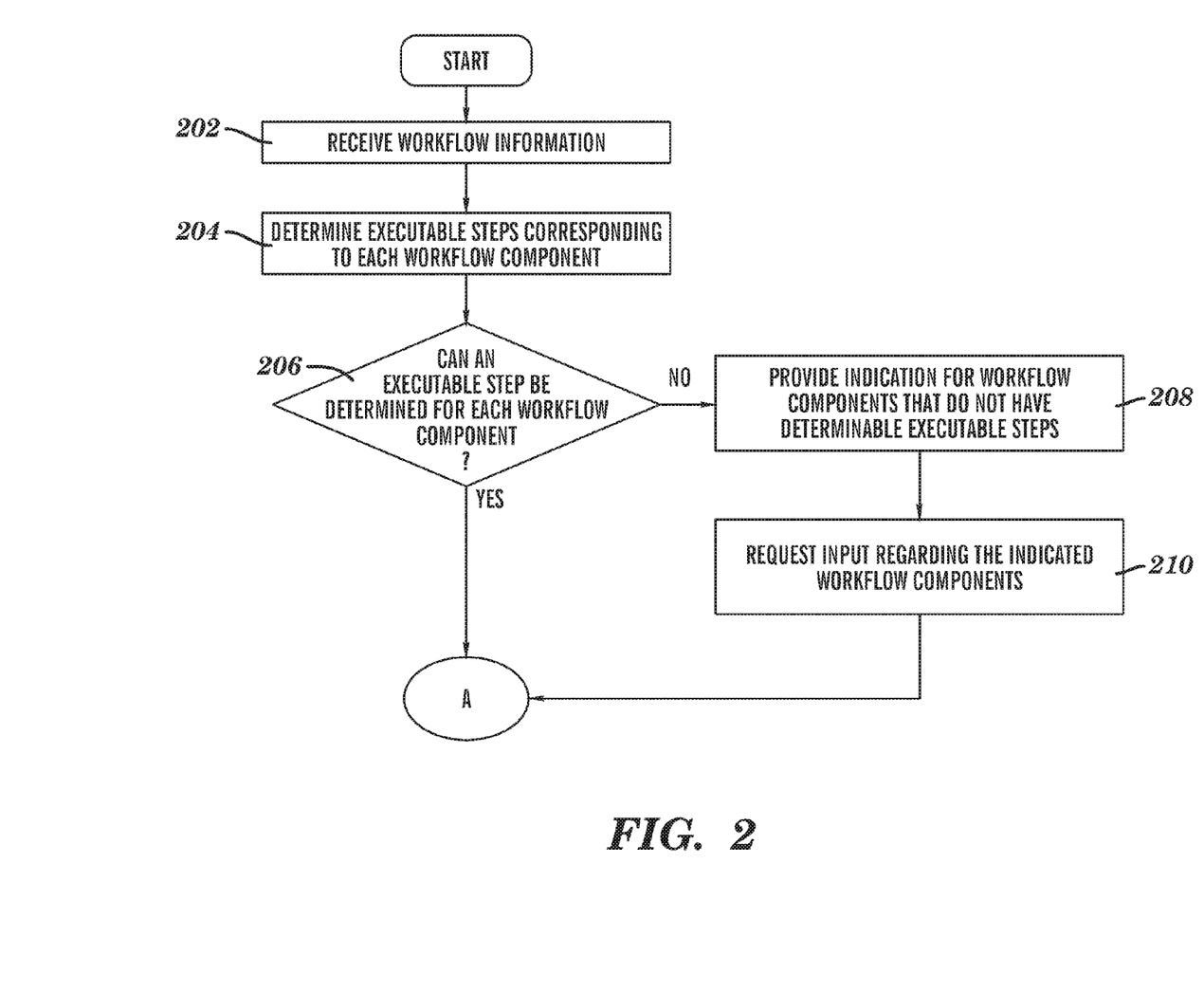
FIGS. 2 and 3 are a flowchart illustrating the operations of the workflow program of FIG. 1 in utilizing natural language processing and voice recognition to create an executable workflow, in accordance with an embodiment of the invention.

FIG. 2 is a flowchart illustrating the operations of workflow program 112 in creating an executable workflow based on received input, in accordance with an example embodiment of the invention. In the example embodiment, workflow program 112 receives workflow information from the user of computing device 110 via user interface 114 (step 202). In the example embodiment, the workflow information may include user input received via voice input or input received via a stylus pen or similar device. For example, the user of computing device 110 may input workflow information by way of free form sketching via a stylus pen or similar device. In other embodiments, the workflow information may be received by workflow program 112 via network 130. In further embodiments, the workflow information may be received via user input by way of other means than described above.

Workflow program 112 determines one or more executable steps corresponding to each workflow component present in the workflow information (step 204). For example, the workflow information may contain user input received via a stylus pen depicting a flowchart with three steps, such as: "Mailbox", "Patent Review Search", and "Archive", written sequentially, all connected with lines containing arrowheads. Workflow program 112 may utilize OCR and natural language processing to determine that the word "Mailbox", written by the stylus pen, refer to "Email", the words "Patent Review Search" refer to "Information involving patent review searches", and the words "Archive" refer to the "Archive storage". In addition, workflow program 112 determines that the lines containing arrowheads connect the components into a workflow and thus the executable steps are to "Open Email", "Identify emails referring to patent review searches", and "Archive the emails".

Workflow program 112 then determines whether an executable step can be determined for each workflow component present in workflow information (step 206). In some cases, such as the example presented above, a workflow component may be too vague and therefore an executable step may not be readily identifiable by workflow program 112. For example, the component "Email" may refer to an assortment of email accounts that a user may have. Therefore, workflow program 112 may not be able to determine an executable step associated with the workflow component.

If workflow program 112 cannot determine an executable step for a workflow component present in workflow information (step 206, "NO branch"), workflow program 112 provides an indication corresponding to each workflow component that does not have a determinable executable step (step 208). In the example embodiment, the indication is a visual indication such as a red light depicted next to the workflow component to show that an executable step cannot be determined for the workflow component. In other embodiments, the indication may be auditory, a vibration when the workflow component is hovered over, or another indicator. In addition, a green light or alternative indicator may be depicted next to workflow components for which workflow program 112 is able to determine one or more executable steps.

Workflow program 112 then requests the user for additional input regarding the indicated workflow components (step 210). For example, workflow program 112 may request to the user of computing device 110 to provide additional input regarding the workflow component "Email" so that workflow program 112 can determine the relevant email account to associate with the component. In other embodiments, workflow program 112 may transmit the request to another computer via network 130.

Figure 3:
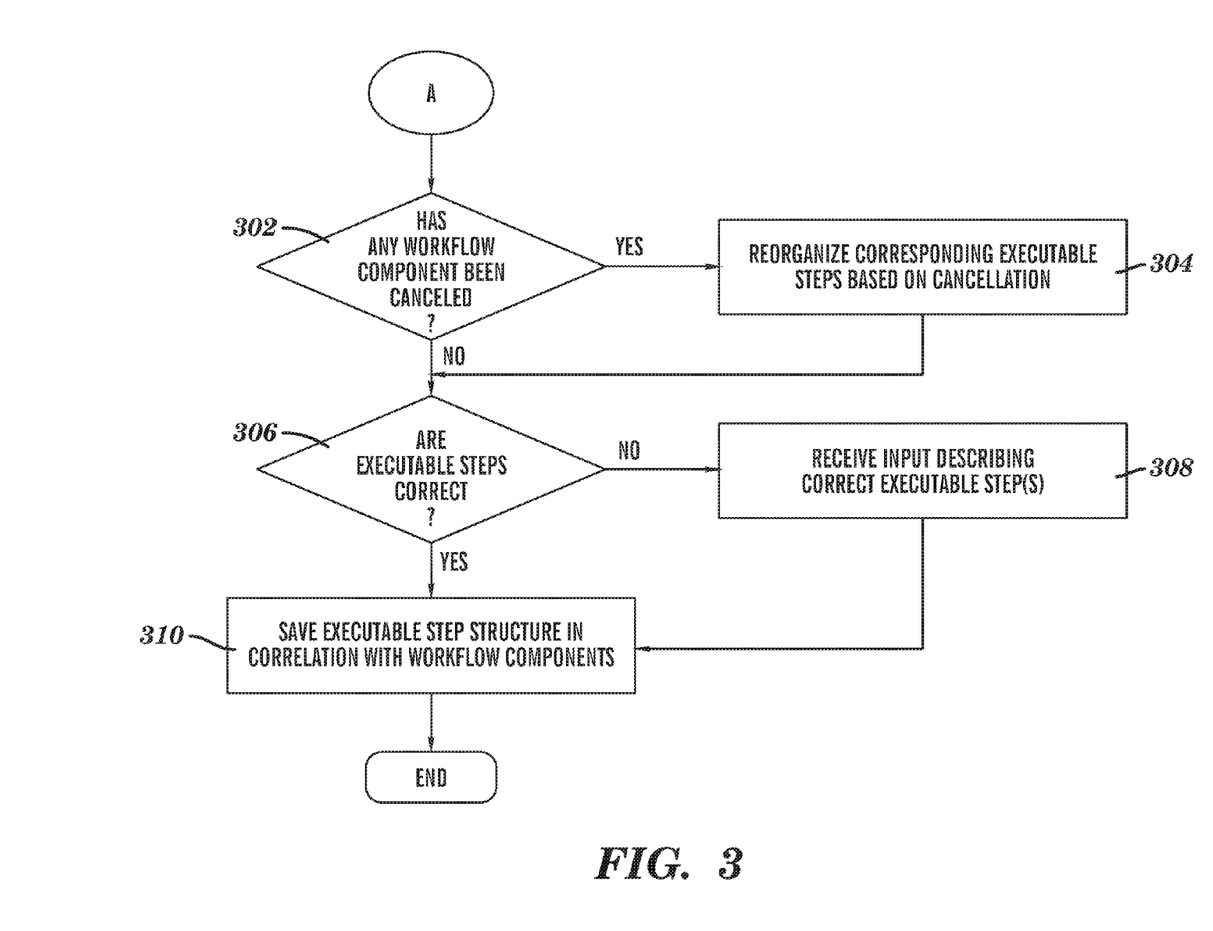

If workflow program 112 determines that an executable step can be determined for each workflow component (step 206, "YES" branch), workflow program 112 determines if any workflow component has been cancelled (step 302). In the example embodiment, a workflow component may be cancelled by a user by way of user input via a stylus pen, such as x-ing out, striking, or double striking through a workflow component. In addition, a connection line may be cancelled in the same manner which may require that remaining workflow components (and corresponding executable steps) and connection lines are rearranged. If workflow program 112 determines that a workflow component has been cancelled (step 302, "YES" branch), workflow program 112 reorganizes the executable steps based on the cancellation (step 304).

If workflow program 112 determines that a workflow component has not been cancelled (step 302, "NO" branch), workflow program 112 determines if the executable steps are correct (step 306). In the example embodiment, workflow program 112 prompts the user of computing device 110 to verify that the executable steps and the order of the executable steps are correct. The user may then provide input via user interface 114 which indicates to workflow program 112 whether the executable steps are correct or not. If workflow program 112 determines that the executable steps are not correct (step 306, "NO" branch), workflow program 112 receives input from the user of computing device 110 describing the correct executable steps (step 308). In the example embodiment, workflow program 112 may request more information from the user of computing device 110 if the user of computing device 110 provides an indication that the executable steps are not correct. Workflow program 112 then alters the executable steps based on the received information and saves the executable step structure in correlation with the corresponding workflow components (step 310).

If workflow program 112 determines that the executable steps are correct (step 306, "YES" branch), workflow program 112 saves the executable step structure in correlation with the corresponding workflow components/workflow (step 310).

In addition, workflow program 112 may transmit the final verified created workflow to social media server 140 via network 130. Therefore, the created workflow may be shared amongst the social network of the user of computing device 110 and subsequently downloaded and executed by other users.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
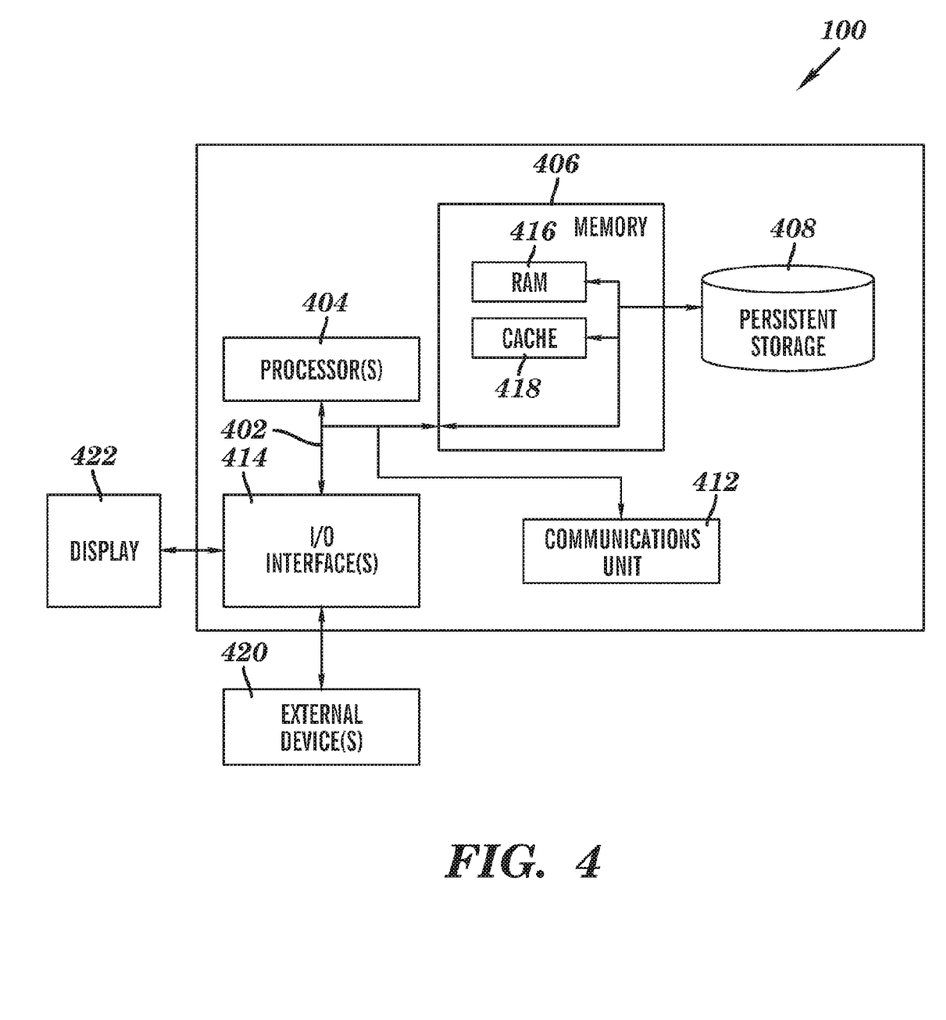
FIG. 4 is a block diagram depicting the hardware components of the workflow creation system of FIG. 1, in accordance with an embodiment of the invention.

FIG. 4 depicts a block diagram of components of computing device 110 and social media server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and social media server 140 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

The programs workflow program 112 and user interface 114 in computing device 110; and social media site 142 in social media server 140 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. The programs workflow program 112 and user interface 114 in computing device 110; and social media site 142 in social media server 140, may be downloaded to persistent storage 408 through communications unit 412.

I/O interface(s) 414 allows for input and output of data with other devices that may be connected to computing device 110 and social media server 140. For example, I/O interface 414 may provide a connection to external devices 420 such as, a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., the workflow program 112 and user interface 114 in computing device 110; and social media site 142 in social media server 140 can be stored on such portable computer-readable storage media and can be loaded onto persistent storage 408 via I/O interface(s) 414. I/O interface(s) 414 can also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining executable steps corresponding to one or more workflow components comprising:
   utilizing natural language processing techniques to analyze one or more workflow components in order to determine whether at least one executable step can be determined for each of the one or more workflow components;
   displaying a visual indication in association with each of the one or more workflow components for which at least one executable step cannot be determined, the visual indication informs a user of each non-executable workflow component;
   transmitting a request to the user for further information describing each of the one or more workflow components for which at least one executable step cannot be determined, the additional information comprises an input from the user clarifying each of the one or more workflow components for which at least one executable step cannot be determined such that at least one executable step is readily identifiable for each of the one or more workflow components;
   determining at least one executable step for each of the one or more workflow components based on the received information describing one or more workflow components and the further information describing at least one of the one or more workflow components; and
   storing the determined at least one executable step for each of the one or more workflow components in correlation with a corresponding workflow component.

2. The method of claim 1, further comprising:
   responsive to determining that at least one executable step can be determined for each of the one or more workflow components, determining whether at least one workflow component of the one or more workflow components has been cancelled.

3. The method of claim 2, further comprising:
   responsive to determining that at least one workflow component of the one or more workflow components has been cancelled, reorganizing at least one of the at least one executable steps determined for each of the one or more workflow components.

4. The method of claim 1, wherein the information describing one or more workflow components is received via voice input.

5. The method of claim 1, wherein the information describing one or more workflow components is received via a device capable of free form sketching.

6. A computer program product for determining executable steps corresponding to one or more workflow components, the computer program product comprising:
   a computer readable storage medium having program instructions embodied therewith, the program instructions executable by a computer to cause the computer to:
   utilize natural language processing techniques to analyze one or more workflow components in order to determine whether at least one executable step can be determined for each of the one or more workflow components;
   display a visual indication in association with each of the one or more workflow components for which at least one executable step cannot be determined, the visual indication informs a user of each non-executable workflow component;

transmit a request to the user for further information describing each of the one or more workflow components for which at least one executable step cannot be determined, the additional information comprises an input from the user clarifying each of the one or more workflow components for which at least one executable step cannot be determined such that at least one executable step is readily identifiable for each of the one or more workflow components;

determine at least one executable step for each of the one or more workflow components based on the received information describing one or more workflow components and the further information describing at least one of the one or more workflow components; and store the determined at least one executable step for each of the one or more workflow components in correlation with a corresponding workflow component.

7. The computer program product of claim 6, further comprising:

responsive to determining that at least one executable step can be determined for each of the one or more workflow components, program instructions to determine whether at least one workflow component of the one or more workflow components has been cancelled.

8. The computer program product of claim 7, further comprising:

responsive to determining that at least one workflow component of the one or more workflow components has been cancelled, program instructions to reorganize at least one of the at least one executable steps determined for each of the one or more workflow components.

9. The computer program product of claim 6, wherein the information describing one or more workflow components is received via voice input.

10. The computer program product of claim 6, wherein the information describing one or more workflow components is received via a device capable of free form sketching.

11. A computer system for determining executable steps corresponding to one or more workflow components, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to utilize natural language processing techniques to analyze one or more workflow components in order to determine whether at least one executable step can be determined for each of the one or more workflow components;

program instructions to display a visual indication in association with each of the one or more workflow components for which at least one executable step cannot be determined, the visual indication informs a user of each non-executable workflow component;

program instructions to transmit a request to the user for further information describing each of the one or more workflow components for which at least one executable step cannot be determined, the additional information comprises an input from the user clarifying each of the one or more workflow components for which at least one executable step cannot be determined such that at least one executable step is readily identifiable for each of the one or more workflow components;

program instructions to determine at least one executable step for each of the one or more workflow components based on the received information describing one or more workflow components and the further information describing at least one of the one or more workflow components; and program instructions to store the determined at least one executable step for each of the one or more workflow components in correlation with a corresponding workflow component.

12. The computer system of claim 11, further comprising:

responsive to determining that at least one executable step can be determined for each of the one or more workflow components, program instructions to determine whether at least one workflow component of the one or more workflow components has been cancelled.

13. The computer system of claim 12, further comprising:

responsive to determining that at least one workflow component of the one or more workflow components has been cancelled, program instructions to reorganize at least one of the at least one executable steps determined for each of the one or more workflow components.

14. The computer system of claim 11, wherein the information describing one or more workflow components is received via a device capable of free form sketching.

15. The computer system of claim 11, wherein the information describing one or more workflow components is received via a device capable of free form sketching.

* * * * *